United States Patent [19]

McFarland

[11] Patent Number: 5,388,227
[45] Date of Patent: Feb. 7, 1995

[54] TRANSPARENT DATA BUS SIZING

[75] Inventor: Harold L. McFarland, San Jose, Calif.

[73] Assignee: Nexgen Microsystems, San Jose, Calif.

[21] Appl. No.: 958,438

[22] Filed: Oct. 7, 1992

Related U.S. Application Data

[63] Continuation of Ser. No. 567,405, Aug. 14, 1990, abandoned.

[51] Int. Cl.[6] .......................................... G06F 13/00
[52] U.S. Cl. ........................... 395/325; 364/DIG. 1; 364/240; 364/240.1; 364/240.3; 364/238.6; 364/239.5; 364/243; 364/260
[58] Field of Search ........................ 395/325, 250, 500

[56] References Cited

U.S. PATENT DOCUMENTS

| | | | |
|---|---|---|---|
| 4,144,562 | 3/1979 | Cooper | 395/325 |
| 4,291,370 | 9/1981 | Charles | 395/325 |
| 4,375,665 | 3/1983 | Schmidt | 395/325 |
| 4,447,078 | 5/1984 | Kinnie et al. | 395/325 |
| 4,494,187 | 1/1985 | Simpson | 395/325 |
| 4,533,992 | 8/1985 | Magar et al. | 395/325 |
| 4,575,796 | 3/1986 | Wako | 395/325 |
| 4,667,305 | 5/1987 | Dill et al. | 395/325 |
| 4,683,534 | 7/1987 | Tietjen et al. | 395/325 |
| 4,716,525 | 12/1987 | Gilanyi et al. | 395/250 |
| 4,831,514 | 5/1989 | Turlakou et al. | 395/500 |
| 4,845,611 | 7/1989 | Turlakou et al. | 395/250 |
| 4,860,198 | 8/1989 | Takenaka | 395/325 |
| 5,003,463 | 3/1991 | Coyle et al. | 395/275 |
| 5,014,186 | 5/1991 | Chisholm | 395/275 |
| 5,113,369 | 5/1992 | Kinoshite | 395/325 |

*Primary Examiner*—Allen R. MacDonald
*Assistant Examiner*—Ayaz R. Sheikh
*Attorney, Agent, or Firm*—Townsend and Townsend Khourie and Crew

[57] ABSTRACT

A bus system wherein N-bit devices (12b,12c) attached to the lower half (30L) of a 2N-bit bus (30) communicate with 2N-bit (12a, 12d) devices attached to the full bus. Bi-directional registered transceivers (60,62,65,67) are coupled between the upper and lower halves of the bus. The N-bit devices are capable of asserting a pair of signals called HOLDN and LATCHN. For a 2 N-bit source device transmitting data to an N-bit sink device, the 2 N-bit source puts 2 N bits of data on the upper and lower halves of the bus during a given cycle, during which the N-bit sink device samples the N bits on the lower half of the bus. The assertion of HOLDN causes the N bits on the upper half of the bus to be latched and subsequently driven onto the lower half of the bus. Where an N-bit source device is communicating to a 2 N-bit sink device, the N-bit device puts the high order N bits and low order N bits of data on the lower half of the bus on successive cycles. During the cycle that the high order bits are on the bus, the N bit source device asserts LATCHN which causes the data to be latched and then driven onto the upper half of the bus during the subsequent cycle,

28 Claims, 5 Drawing Sheets

FASTEST SINGLE-DWORD READ OPERATION

SINGLE-DWORD READ WITH WAIT STATES

FASTEST SINGLE-DWORD WRITE OPERATION

SINGLE-DWORD WRITE WITH WAIT STATES

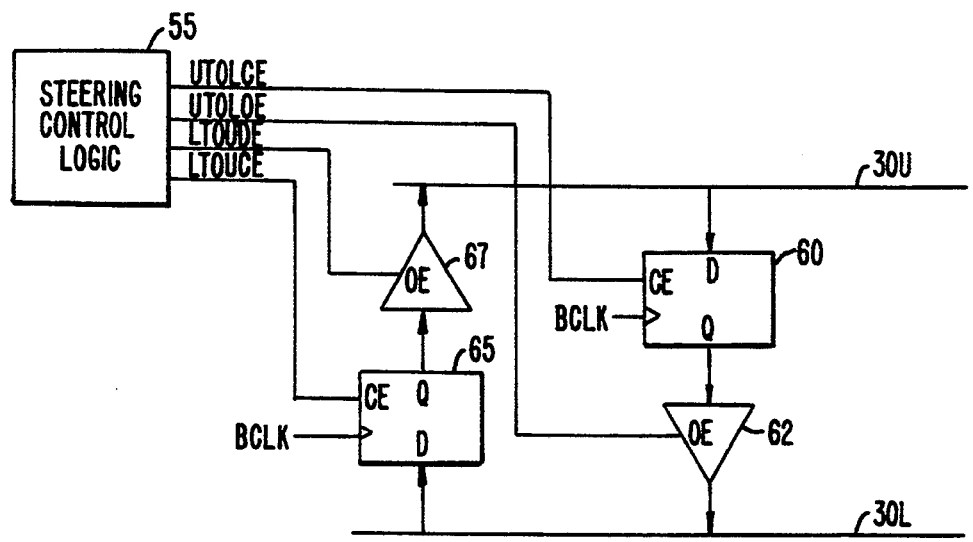
FIG. 4.
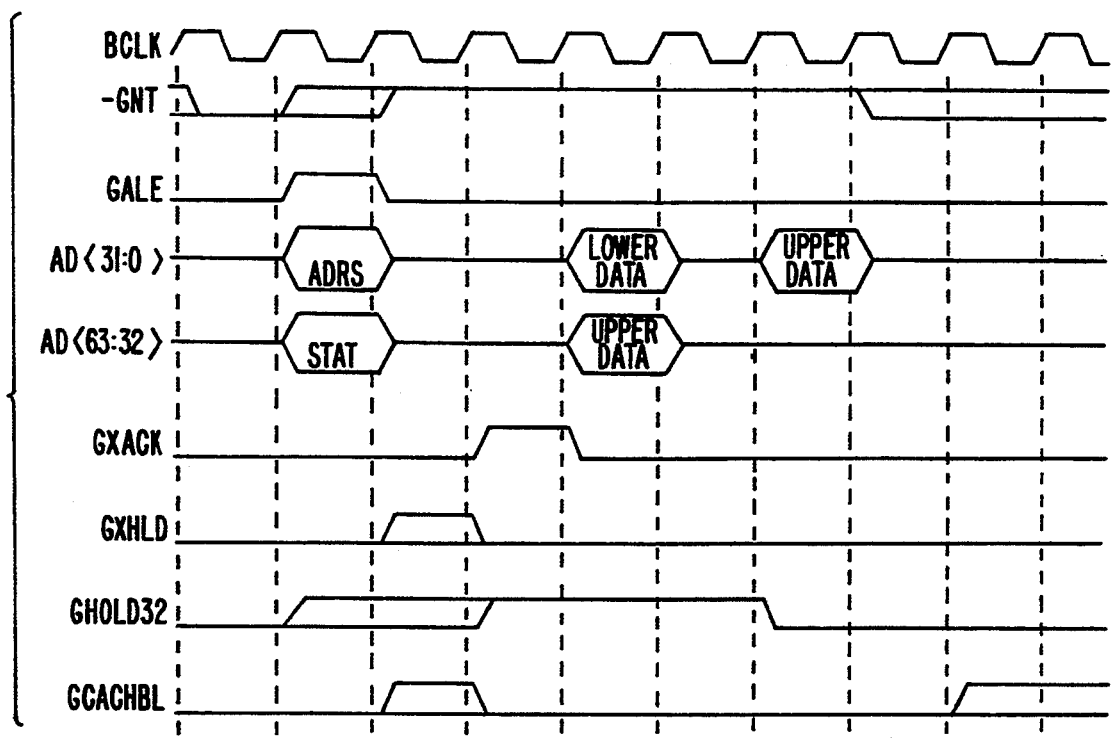
FIG. 5A. (64-BIT TO 32-BIT)

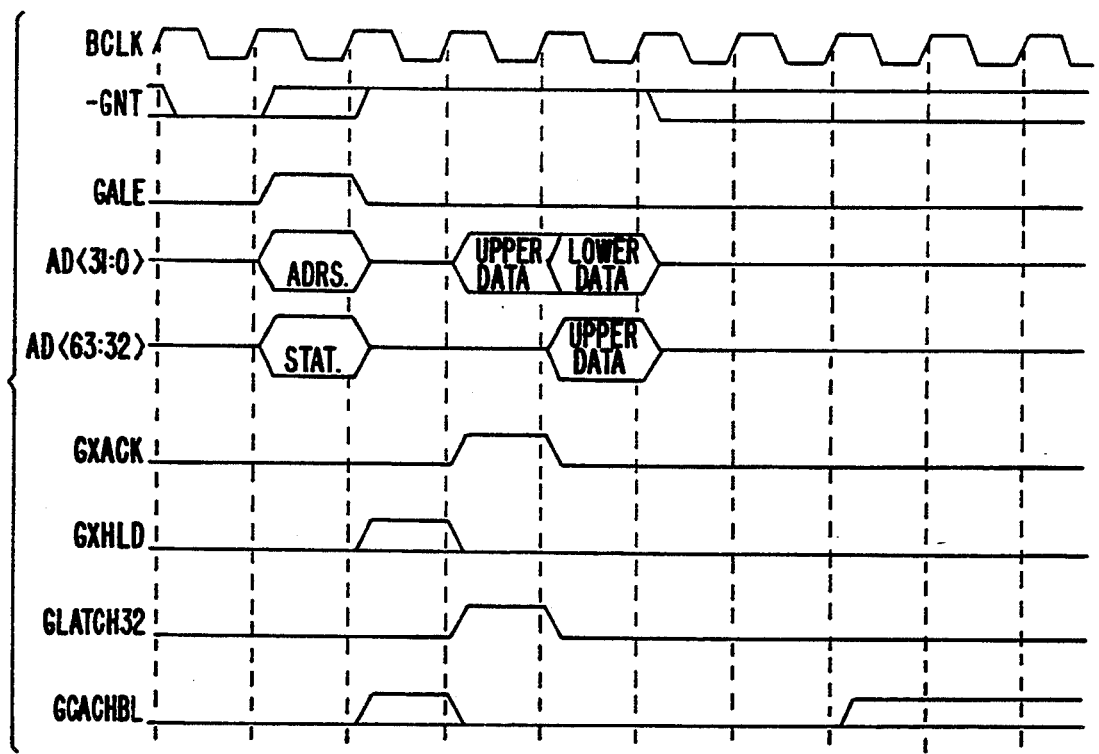
*FIG. 5B.* (32-BIT TO 64-BIT)
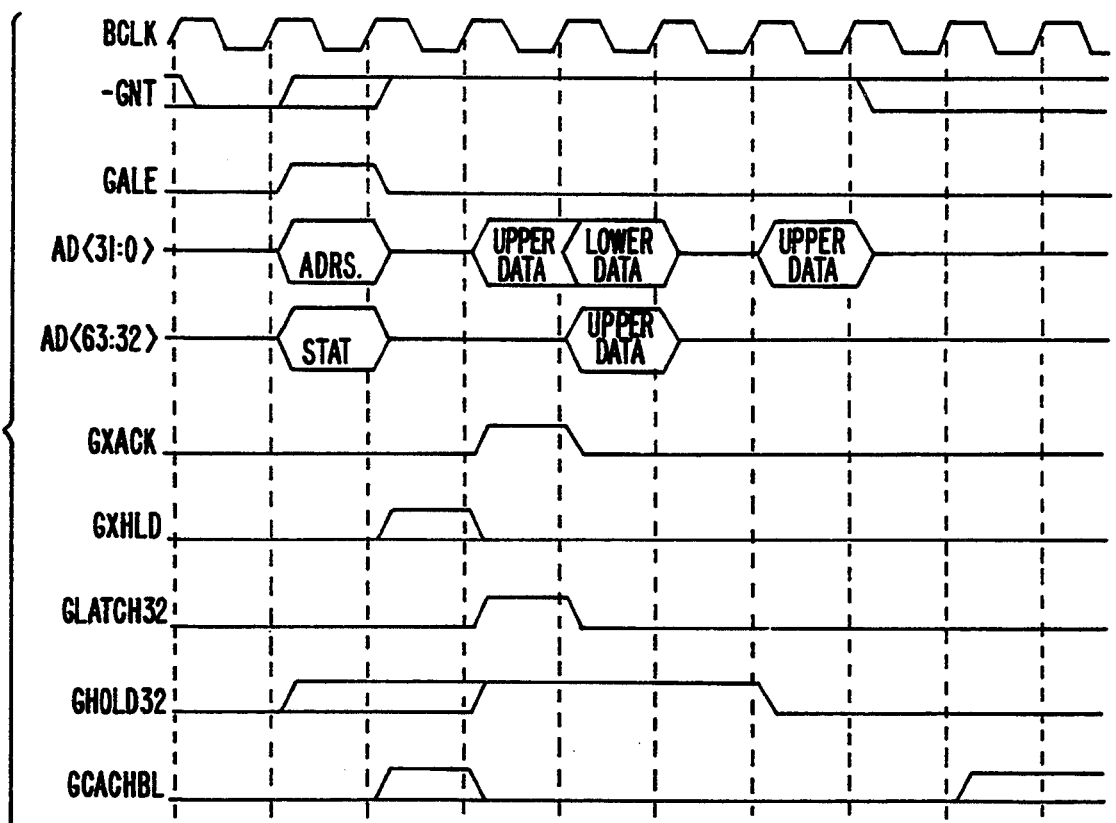
*FIG. 5C.* (32-BIT TO 32-BIT)

TRANSPARENT DATA BUS SIZING

This is a continuation of applicatoin Ser. No. 07/567,405, filed Aug. 14, 1990, now abandoned.

BACKGROUND OF THE INVENTION

The present invention relates generally to data bus communications, and more specifically to a system where different peripherals on a bus may be characterized by data widths that are different from the width of the data bus.

As computer systems have evolved, the data path has gotten wider. In recognition of the fact that peripheral devices do not always match the system bus width, provision has been made for dynamic bus sizing. For example, the standard PC AT architecture uses a 16-bit data bus (SD-bus), and provides a separate 8-bit bus (XD-bus) for the attachment of 8-bit devices. Similarly, the PS/2's Microchannel architecture uses a 32-bit data path, with provision for attachment of 16-bit devices. Logic on the system board controls bus crossover logic (data swapper) to allow the data on the lower half of the bus to be steered to the upper half of the bus, or vice versa, depending on the particular situation.

Consider, for example, a situation where a 32-bit master addresses a 16-bit slave attached to the lower half of the bus. According to a typical prior art approach, the slave signifies it is a 16-bit device, and provides 16 bits of data on the lower half of the bus. The master then makes a separate request for the other 16 bits, and specifies that it will receive that data on the upper half of the bus. This approach provides the needed flexibility, but suffers from the problem that the master has to make a separate request for the second half of the data, which is costly in terms of bus cycles.

SUMMARY OF THE INVENTION

The present invention is drawn to a bus system that effectively handles communications between N-bit devices attached to the lower half of a 2N-bit bus and 2N-bit devices attached to the full width of the bus. The system is transparent in that the 2N-bit device does not have to account for the fact that it is communicating with an N-bit device, and the complete transaction is carried on within a single bus transaction.

In a situation where a 2N-bit source device is transmitting 2N bits of data to an N-bit sink device, crossover logic includes a swap-down register for storing data present on the upper half of the bus and a swap-down driver for driving the swap-down register contents onto the lower half of the bus. The N-bit device generates a signal called HOLDN from which are derived signals to control the crossover logic. The 2N-bit source puts the 2N bits of data on the upper and lower halves of the bus during a first given cycle, during which the N-bit sink device can sample the low-order N bits on the lower half of the bus. The assertion of HOLDN causes the high-order N bits on the upper half of the bus to be latched into the swap-down register, and subsequently causes the swap-down driver to put the data on the lower half of the bus in a second given cycle so that the N-bit sink device can sample it.

In a situation where an N-bit source device is communicating data to a 2N-bit sink device, crossover logic includes a swap-up register for storing data present on the lower half of the bus and a swap-up driver for driving the swap-up register contents onto the upper half of the bus. The N-bit device generates a signal LATCHN from which are derived signals to control the crossover logic. The N-bit source device puts the high-order N bits and the low-order N bits of the. data on the lower half of the bus on successive bus cycles. During the cycle that the high-order N bits of data are on the bus, the N-bit source asserts a LATCHN signal which causes the data to be latched into the swap-up register and then be driven onto the upper half of the bus during the subsequent cycle (when the low-order N bits of the data appear on the lower half of the bus).

The present invention has the advantage of transparency in the sense that a 2N-bit source device puts 2N bits of data on the bus in a single cycle, and a 2N-bit sink device takes 2N bits of data off the 2N-bit wide bus in a single cycle. In neither case does the 2N-bit device have to take any special action when it deals with an N-bit wide device. Furthermore, the nature of the protocol, using the HOLDN and LATCHN signals allows the complete data transfer to occur in a single bus transaction. That is, there is only need for a single address phase during the transfer.

The transparency alluded to above has the surprising consequence that N-bit devices can communicate with each other. Such a transaction makes use of both the swap-up and the swap-down logic. While this seems more convoluted than a direct transfer on the lower half of the bus, it has the advantage that no separate protocol or logic are required beyond those that permit N-bit and 2N-bit devices to communicate.

A further understanding of the nature and advantages of the present invention may be realized by reference to the remaining portions of the specification and the drawings.

BRIEF DESCRIPTION OF THE DRAWINGS

FIG. 4 is a schematic of the steering control and crossover logic;

FIG. 5A is a timing diagram of a data transfer from a 64-bit adapter to a 32-bit adapter;

FIG. 5B is a timing diagram of a data transfer from a 32-bit adapter to a 64-bit adapter; and FIG. 5C is a timing diagram of a data transfer between 32-bit adapters.

BRIEF DESCRIPTION OF THE APPENDICES

Appendix 1 describes the system bus (NexBus) signals;

Appendix 2 sets forth the control signals for the system bus;

Appendix 3 sets forth the AD-bus format during the address/status phase; and

Appendix 4 sets forth the PAL equations for the steering control logic.

DESCRIPTION OF SPECIFIC EMBODIMENTS

System Overview

Figure 1:
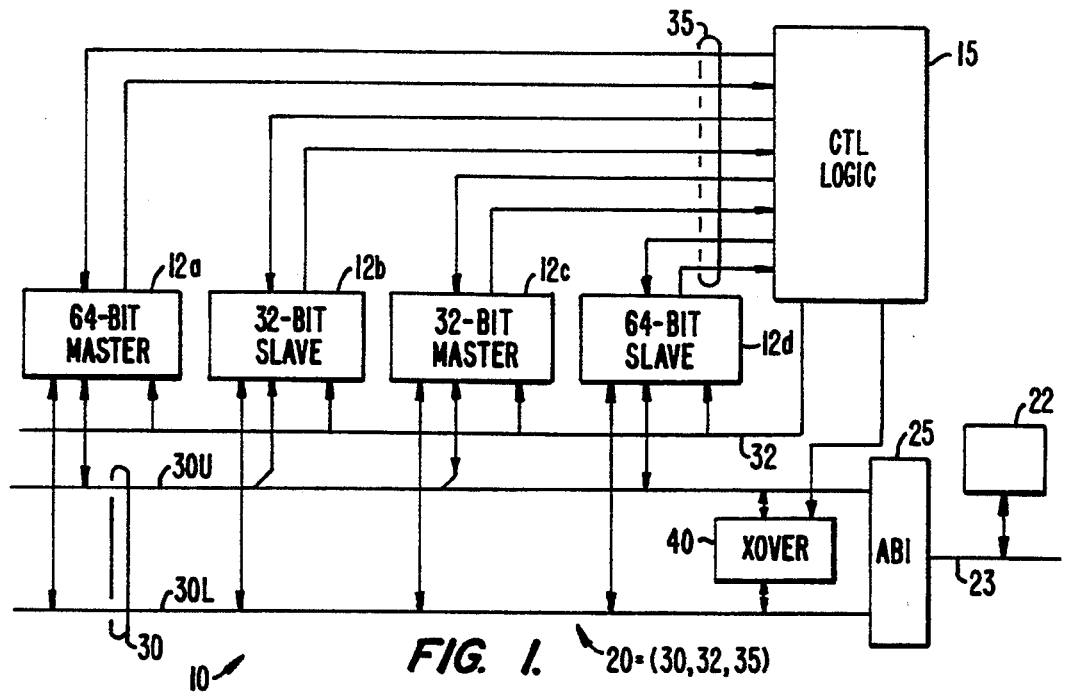
FIG. 1 is a system block diagram illustrating the major data and control paths.

FIG. 1 is a block diagram of a data communication system 10 incorporating the present invention. Within system 10, a number of devices 12a–d, referred to as adapters, communicate with each other and with control logic 15 via a system bus 20, sometimes referred to as NexBus 20. In accordance with known practice, the bus lines are implemented as signal traces on a backplane circuit board referred to as a motherboard, and the adapters and at least some control logic are built on circuit boards, which are plugged into connectors on motherboard. The adapters may include one or more processor boards, one or more memory subsystems shared between the processors, and optional high-speed I/O devices. Communication with other devices 22 coupled to an alternate bus (AB) 23 is established via an alternate bus interface (ABI) 25. Examples of the AB are the PC AT bus, the Extended Industry Standard Architecture (EISA) bus, or the PS/2's Microchannel.

System bus 20 includes a multiplexed address and data bus (AD-bus) 30 having an upper bus half 30U and a lower bus half 30L, a set of bused control lines 32, and a set of radial lines 35. Appendix 1 provides a description of the bus signals. Appendix 2 is a table setting forth the bused control signals and the radial signals.

In a specific embodiment, AD-bus 30 is 64 bits wide, so that each bus half is 32 bits wide. Bit positions on the AD-bus are numbered from 63 to 0, with bit position 63 being the most significant or highest order bit. Thus upper bus half 30U includes AD<63:32> and lower bus half 30L includes AD<31:0>. The AD-bus is a multiplexed address/data bus wherein a master communicates address and status in one phase, and the master or the addressed slave communicates data in a subsequent phase. Appendix 3 sets forth the information that is communicated during the address/status phase.

Although the AD-bus is 64 bits wide, the adapters may be 64-bit or 32-bit devices (i.e., may have data paths that are 64 bits wide or 32 bits wide). For a specific example, adapter 12a is a 64-bit master, adapter 12b is a 64-bit slave, adapter 12c is a 32-bit master, and adapter 12d is a 32-bit slave. The 32-bit devices have receivers coupled to the full width of the AD-bus so as to receive address and status information, but have data buffers and drivers coupled only to the lower bus half. Crossover logic 40, coupled between upper bus half 30U and lower bus half 30L, permits the transfer 30 of data from one bus half to the other according to signals from control logic 15.

Figure 2:
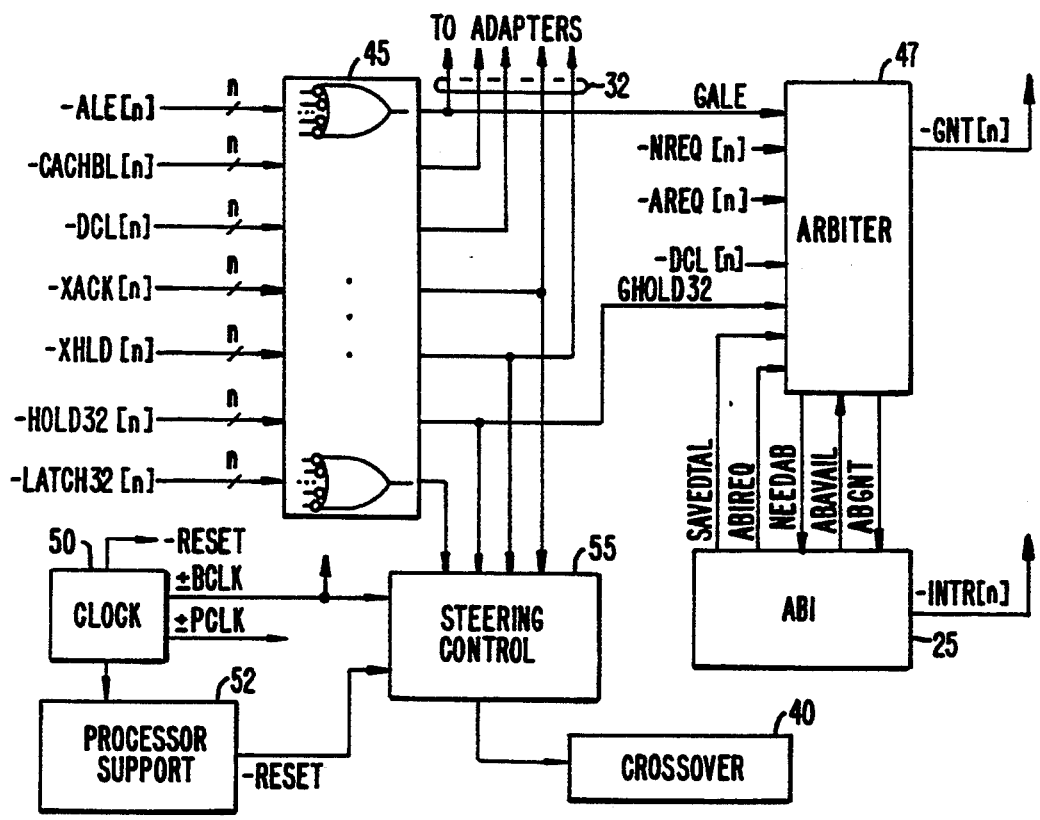
FIG. 2 is a block diagram of the motherboard control logic.

FIG. 2 is a block diagram of the motherboard circuitry including control logic 15, ABI 25, and crossover logic 40. The basic subsystems within control logic 15 are group logic 45, arbiter 47, a clock generator 50, and processor support circuitry 52, and steering control logic 55.

Group logic 45 is responsive to a number of radial signals from the adapters, and generates group signals. Most of the group signals are communicated to the adapters in a bused fashion, while some are only communicated to other portions of the control logic. The radial signals from the adapters are active low, and their group counterparts are active high signals. A given group signal is generated by NANDing the given radial signal from each of the adapters. For example, the -ALE signals from all the adapters are NANDed to form the GALE signal.

Arbiter 47 is responsible for responding to request signals from the adapters (-NREQ[n], -AREQ[n]) or from ABI 25 (ABIREQ), and issuing grant signals to an adapter (-GNT[n]) or the ABI (ABIGNT). Clock generator 50 provides the +/-BCLK bus clock signals that define the bus period, which may be on the order of 30 ns. Processor support circuitry 52 provides programmable interrupt controllers for one or more of the processors, and is also responsible for such support functions as providing reset signals. Steering control logic 55 responds to the GXACK, GXHLD, GHOLD32, and GLATCH32 signals, and provides signals to crossover logic 40.

Basic Bus Arbitration

In order to begin an operation, a device must be granted mastership of the bus through the arbitration process. Arbitration and bus grant are performed using the -NREQ[n], -AREQ[n], -DCL[n], and -GNT[n] lines. Normally, arbiter 47 will assert a -GNT line in response to a request on one of the -NREQ or -AREQ lines, and the master receiving the bus becomes a permanent bus master. If the bus is granted in response to a -NREQ, the master becomes the permanent NexBus master. If the grant is issued in response to a -AREQ, the master also becomes the permanent AB master. However, the bus may also be granted to "temporary" masters under certain conditions, namely, DCL intervention, AB lock, and ABI request, as discussed below.

If an adapter asserts its -DCL[n] line during an operation and keeps it asserted at the end of the operation, the bus is unconditionally granted to that adapter (the intervenor) for the next operation. This is done by asserting the intervenor's -GNT line; the intervenor then assumes temporary bus mastership, solely for the purpose of performing a cache block write-back to maintain cache coherency.

If no -DCL line is asserted (GDCL is negated) at the end an operation, and if a permanent AB master continues to assert -AREQ at the end of the operation, then the arbiter regrants the bus to the permanent AB master. This is done by asserting the adapter's -GNT line.

If GDCL is negated at the end of an operation and either the permanent master is not an AB master or the permanent master's -AREQ is negated, and the arbiter receives a bus request (ABIREQ) from ABI, then the ABI receives the bus to perform a crossing transfer.

Granting the bus to a temporary master does not change the identity of the permanent bus master. If GDCL is negated at the end of an operation and no ABIREQ is asserted and no -NREQ or qualified -AREQ requests are asserted, then the arbiter grants the bus to the previous permanent bus master, even if the master is not requesting it. Permanent bus mastership is only changed in response to the assertion of a -NREQ or -AREQ in the absence of GDCL and ABIREQ.

A grant becomes effective only when the adapter that is granted the bus actually assumes bus mastership. An adapter assumes bus mastership by beginning an operation, which it may do by asserting its -ALE line for one clock period. It may do this in any clock that immediately follows a clock period during which its -GNT line was asserted. Simultaneously with the assertion of its -ALE, the adapter must negate its request line if it does not intend to request another bus operation immediately. If the requester does intend to perform another bus operation after the current transaction is over and it does not intend to begin a locked sequence it can continue driving its request line active, provided that it has not held the bus for more than 1.5 microseconds.

To avoid bus contention caused by the turn on and turn off time of different adapters buffers driving the AD<63:0> lines, there must be a minimum of one idle clock between operations. This is assured by the arbiter's negating all -GNT lines in the clock following a GALE, and keeping them negated until an end-of-operation is detected, as determined by detecting that GXACK has been asserted and then GXACK has become negated and that no -HOLD32 line is asserted. The arbiter may issue a new grant in the clock following the first clock in which GXACK and all -HOLD32's become negated, which immediately follows the last data transfer. The new master cannot assert GALE until the next clock, insuring that no one drives AD<63:0> during the first clock that the grant is asserted.

Basic Data Transfer

Any NexBus operation begins with arbitration, followed by an address phase and a data phase. Adapters on the NexBus arbitrate for control of the NexBus as outlined above. The requesting adapter, having seen that its -GNT line is asserted and GALE is negated, places the address of a 64-bit DWord on AD<31:3> (for memory-reference operations) or the address of a 32-bit Word on AD<15:2> (for I/O operations). It drives status bits on AD<51:32> and asserts its -ALE signal to assume bus mastership and to indicate that there is valid address on the bus. As seen in Appendix 3, the status information includes the type of operation to be performed and Byte-Enable bits defining the subset of the DWord that is required in the (first) data transfer. The master asserts its -ALE signal for only one bus clock. The slave uses the GALE signal to enable the latching of address and status from the bus.

Figure 3A:
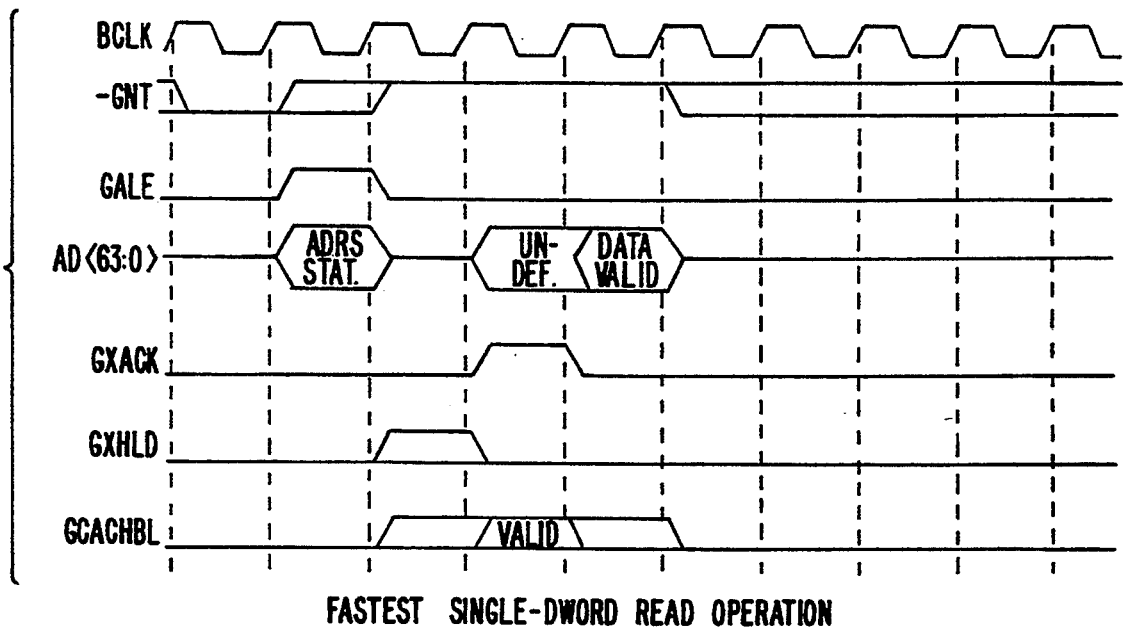
FIGS. 3A–D are timing diagrams illustrating single-DWord read and write operations between 64-bit adapters.

FIG. 3A is a timing diagram of a single-DWord operation between 64-bit adapters (say 64-bit master 12a and 64-bit slave 12b) without wait states. The data phase of a single-DWord read operation starts when the slave responds to the master's request by asserting its -LACK signal. The master samples the GXACK and GXHLD signals to determine when data is placed on the bus. It samples data from the bus at the end of the clock after GXACK is asserted and GXHLD is negated. The operation finishes with an idle phase of at least one bus clock.

A slave may not assert its -LACK line until the second clock following GALE. (This protocol guarantees enough time to allow caching devices to recognize a dirty cache block and to assert GDCL in time to cancel the data transfer) However, the slave must always assert its -LACK signal during or before the third clock following the GALE, since otherwise the absence of an active GXACK indicates to ABI 25 that the address which the master is accessing resides on AB 23; the ABI must then assume the role of slave and assert GXACK. If appropriate, the slave must assert its -CACHBL signal no later than it asserts -LACK, and it must keep -CACHABL asserted until it drops -XACK. It must drive -CACHBL inactive at or before it stops placing data onto the bus.

Figure 3B:
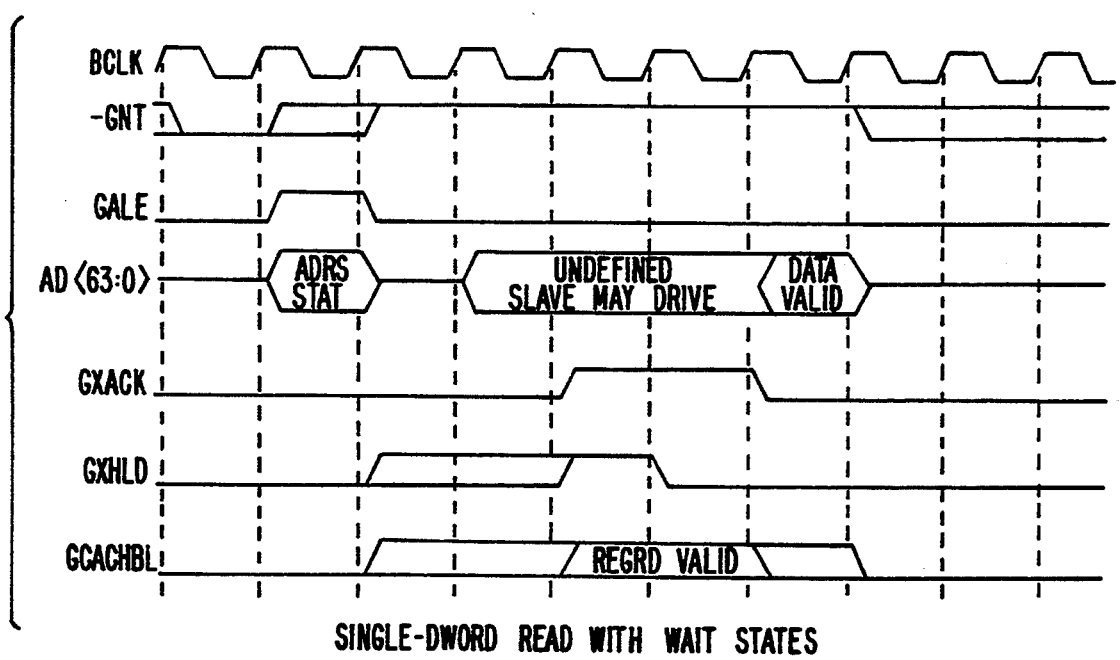

FIG. 3B is a timing diagram of a single-DWord read operation with wait states. If the slave is unable to supply data during the clock immediately following the clock during which it asserts -XACK, the slave must assert its -XHLD line at the same time. Similarly, if the master is not ready to accept data in the next clock it must assert its -)GILD line. The slave supplies data in the clock following the first clock during which GXACK is asserted and GXHLD is negated, and the master strobes the data at the end of that clock.

For a single-DWord read, the slave must negate -XACK after a single clock during which GXACK is asserted and GXHLD is negated, and it must stop driving data onto the bus one clock thereafter. The master may not assert -XHLD while GALE is asserted, nor may either party to the transaction assert -XHLD after the slave negates GXACFL In the case shown, the slave asserts GXACK at the latest allowable time, thereby inserting one wait state, and GXHLD is asserted for one clock to insert an additional wait state. While the slave may or may not drive the AD/63:0> lines during the wait states, the master must not drive them during the data phase of a read operation.

Figure 3C:
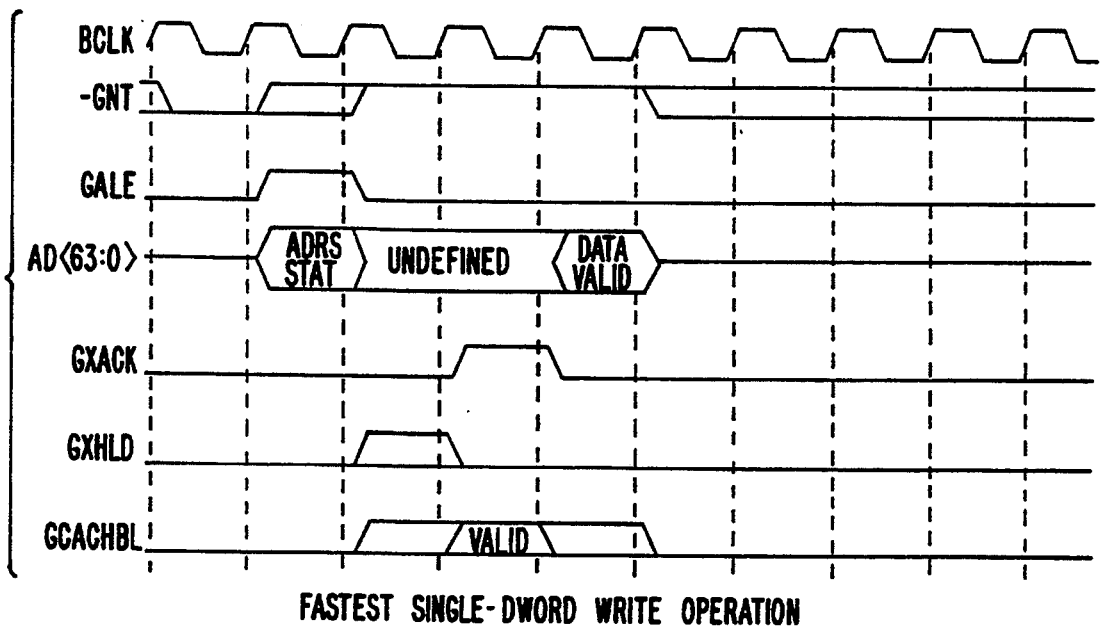
Figure 3D:
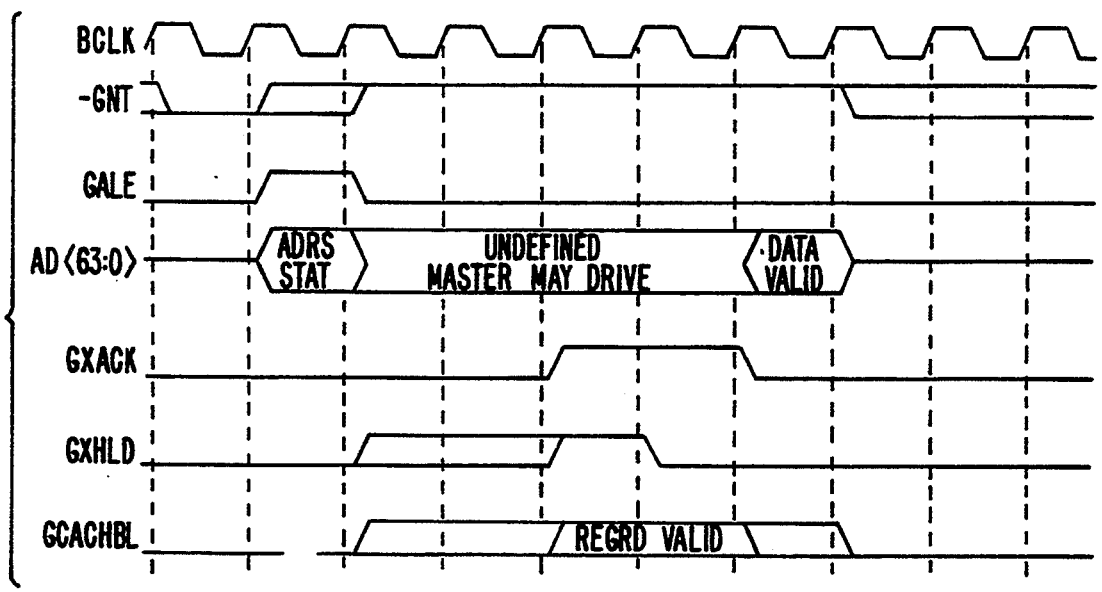

FIGS. 3C and 3D are timing diagrams of single-DWord write operations without and with wait states. Once the bus is granted, the master provides the address and status on the bus and drives its -ALE line active. As in the read operation, the slave must assert its -XACK signal during either the second or third clock following the GALE. If it is not ready to strobe the data at the end of the clock following the assertion of GXACK, the slave must assert its -XHLD line until it is ready to receive data during the following clock. Unless it asserts its -XHLD line, the master must place the data onto the bus in the clock following the clock during which GXACK becomes asserted, which may be as soon as the third clock following the clock in which GALE is asserted. The slave will sample GXHLD to determine when data is valid on the bus. The master may drive data onto the bus as soon as it desires, but it must continue to drive the data onto the bus for one clock (and only one) after it sees GXACK asserted with GXHLD negated. As in the read operation, the slave's -XACK is asserted until the clock following the trailing edge of GXHLD.

Operations To 8-, 16-, and 32-Bit Devices

While the ability to perform multi-DWord block operations is optional, all adapters that can function as slaves in the memory address space of the NexBus must at least be designed to provide and accept up to a full 64-bit DWord in a single-DWord operation, if requested to do so. NexBus I/O adapters must be able to transfer up to four bytes of data in a single NexBus operation. If, for example, a device being accessed is actually 8 bits wide, its NexBus adapter must make multiple internal accesses to buffer the number of bytes requested, up to eight (if memory-mapped) or four (if I/O-mapped).

NexBus masters must communicate with 8-, 16-, and 32-bit devices on the AB via the ABI. When a NexBus master performs a crossing transfer the ABI performs multiple AB operations as required to satisfy the NexBus master. Of course, a NexBus master may request less than the full 8 bytes of a DWord, and will usually do so. In such a case, the ABI can and should perform only the number of AB operations required to provide or accept the bytes indicated by the Byte Enable bits from the NexBus master.

While the NexBus supports only DWord and multi-DWord block transfer protocols, steering control logic 55 and crossover logic 40 provide mechanisms to allow adapters having only 32-bit wide data paths to perform single-DWord NexBus operations as either a master or slave. As will be described more fully below, a 32-bit adapter controls its -LATCH32[n] or -HOLD32[n] signal line to signify to the steering control logic that it is a 32-bit adapter and requires the invocation of such mechanisms.

FIG. 4 is a schematic of steering control logic 55 and crossover logic 40. Crossover logic 40 includes a swap-down register 60, a swap-down driver 62, a swap-up register 65, and a swap-up driver 67, each 32 bits wide. Swap-down register 60 and swap-down driver 62 are connected in series, with the swap-down register data input coupled to upper bus half 30U, and the swap-down driver output coupled to lower bus half 30L. In a similar manner, swap-up register 65 and swap-up driver 67 are coupled in series with the swap-up register data input coupled to lower bus half 30L and the swap-up driver output being coupled to upper bus half 30U.

Steering control logic 55 is responsive to a number of the group signals, namely GXACK, GXHLD, GHOLD32, and GLATCH32, as well as the BCLK and RESET signals, and uses these to derive clock enable and output enable signals to control crossover logic 40. Steering control logic 55 preferably comprises a programmable array logic (PAL) device, programmed to produce the control signals that implement the protocols described below.

Specifically, the steering control logic generates a pair of clock enable signals UTOLCE and LTOUCE, and a pair of output enable signals UTOLOE and LTOUOE. The PAL equations are set forth in Appendix 4. The LTOUCE and LTOUOE signals are, in essence, delayed versions of GLATCH32 and -GLATCH32. The generation of the UTOLCE and UTOLOE signals are more complicated, and depend on the output of a state machine, designated HS. The state machine has two state bits (not actually used outside the PAL chip) and accordingly has four states, HSIDLE, HS1, HS2, and HS3, for state bit values (11), (10), (01), and (00), respectively.

Registers 60 and 65 have clock inputs that receive the BCLK signal from clock generator 50 and clock enable inputs that receive the clock enable signals from steering control logic 55. Drivers 62 and 67 are 3-state devices that present a high impedance to the bus when not enabled. The drivers receive the output enable signals from steering control logic 52. In a representative embodiment, crossover logic 40 comprises four 29FCT52A 8-bit registered transceiver chips, available from Integrated Device Technology, Inc.

Swap operation is invoked by the -LATCH32[n] and/or -HOLD32[n] group signals. Note that only single-DWord operations are supported to/from a 32-bit-wide adapter; a 32-bit-wide master must initiate block operations, and a 32-bit-wide slave must negate its -CACHBL line and respond to any block transfer request with a single-DWord transfer.

FIG. 5A is a timing diagram of a single DWord operation between a 64-bit adapter that is acting as a data source (e.g., master 12a performing a write or slave 12b responding to a read) and a 32-bit adapter that is acting as a data sink (e.g., master 12c performing a read or slave 12d responding to a write) with no wait states. The 32-bit sink performs a normal operation, save that it asserts its -HOLD32 line not later than the clock preceding the data transfer, i.e., the clock in which GXACK is asserted and GXHLD is negated. This causes steering control logic 55 to enable the clock input of swap-down register 60 so as to clock the data present on AD<63:32> into the swap-down register in the clock following the clock during which GXACK is asserted and GXHLD is negated. During the second clock following the clock in which GXACK is negated, and continuing until the clock after -HOLD32 is negated, the steering control logic enables swap-down driver 62 so as to drive the content of swap-down register 60 onto AD<31:0>, allowing the 32-bit adapter to sample it. Arbiter 47 monitors the -HOLD32 lines and does not grant the bus to begin another operation as long as any -HOLD32 is asserted. If the 32-bit adapter needs additional time between the transfer of the loworder data and receiving the high-order data, it can extend the period of time during which the highorder data is driven onto AD<31:0> by continuing to assert -HOLD32.

FIG. 5B is a timing diagram of a single DWord operation between a 32-bit adapter that is acting as a data source and a 64-bit adapter that is acting as a data sink. The 32-bit adapter first drives data for the high-order four bytes of a DWord onto AD<31:0> and asserts its -LATCH32 in the same clock. This causes steering control logic 55 to enable the clock input of swap-up register 65 so as to clock the high-order data into the swap-up register immediately and to enable swap-up driver 67 so as to drive the register contents onto AD<63:32> at the next clock. In the next clock the 32 bit data provider can change the data on AD<31:0> to the low-order four bytes and proceed with the 64-bit operation. The steering control logic continues to enable the driver so as to drive AD<63:32>until it sees -LATCH32 negated at the beginning of a clock.

Wait states can be inserted via -XHLD, in the usual way. This may be required if the 32-bit data source cannot immediately supply the low-order data bytes. If wait states are inserted, the 32-bit adapter must continue to assert -LATCH32 until it sees GXACK asserted and GXHLD negated at the beginning of a clock, and it must then negate its -LATCH32 (at the same time as GXACK is negated).

The two transactions described above are transparent to the 64-bit device; the 64-bit adapter does not have to do anything differently because it is dealing with a 32-bit adapter. In fact it does not know that it is dealing with a 32-bit adapter. Of course the 32-bit adapter must know that it is a 32-bit adapter and assert its -HOLD32 or its -LATCH32, as the case may be.

This transparency works both ways. Two 32-bit adapters can communicate with each other without either knowing that it is communicating with another 32-bit device.

FIG. 5C is a timing diagram of a single DWord operation between a 32-bit adapter that is acting as a data source and a 32-bit adapter that is acting as a data sink. In this transaction, the 32-bit source controls its data drivers and -LATCH32 line to place the data across the full 64-bit bus, as if it were sending to a 64-bit sink. The 32-bit sink controls its data receivers and its -HOLD32 line as if it were receiving from a 64-bit source. Although it would be possible to design a protocol where only the lower half of the bus is used, that would require that the 32-bit adapter know that it is dealing with another 32-bit adapter.

Conclusion

In conclusion it can be seen that the present invention provides a simple and effective way to manage narrow devices on a wicle bus.

While the above is a complete description of the preferred embodiments of the invention, various alternatives, modifications, and equivalents may be used.

For example, while the AD-bus is shown as a multiplexed bus, it could, in principle, be implemented with separate address and data lines.

Therefore, the above description should not be taken as limiting the scope of the invention which is defined by the appended claims.

Appendix 1 - NexBus Signal Description.

AD<63:0>: Address, Status and Data bits 63 through 0: This bus conveys either address and status or data. During an address transfer phase, indicated by the assertion of GALE, AD<63:0> contains address and status information defining a bus operation. During the data transfer phase, signaled by the assertion of GXACK, this bus contains up to 64 bits of data.

-ALE[n], GALE: Address Latch Enable: The -ALE[n] signals are issued by the master. The GALE signal is monitored by all devices on the NexBus to latch the address placed on the bus by the master.

-AREQ[n]: The Alternate Bus Request signals are driven by would-be masters on the NexBus to secure bus mastership together with control of the AB. The arbiter examines these signals together with the -NREQ signals (q.v.) and the state of the Alternate Bus Interface to determine which device is to be granted mastership of the NexBus. It also passes AB requests to the ABI to cause it to gain control of the AB. The requesting devices drive these signals active at the rising edge of the BCLK.

AUDIO: This is an audio sum node used to drive audio signals from an adapter to the system audio output, or to transfer audio signals between adapters. This line is electrically compatible with the similar line defined on the Microchannel bus, and in a system having a Microchannel bus as an AB it may be electrically connected to the Microchannels's AUDIO line.

AUDIO GND: This is a separate ground for the audio subsystem. It must never be connected to system GND at any point except the subsystem's audio amplifier (radial grounding).

+/--BCLK: These are the TTL-level bus clock and its inversion which define the NexBus clock period. They are received on each board by a clock chip and are terminated on-board by a 180 ohm resistor connecting +BCLK to -BCLK.

-CACHBL[n], GCACHBL: Cacheable: The -CACHBL[n] signals are driven active by slaves to indicate that portions of their address space may be caCheable. The ABI may drive this signal as noncacheable to indicate that all the devices on the Alternate Bus are non-cacheable. If a slave does not assert its -CACHBL signal, it cannot support block transfers.

-CHCHK: Channel Check is generated on the adapters on the NexBus upon detection of a systemwide error condition. It is gated by logic in the ABI to cause the -NMI pin of the primary processor on the NexBus to be asserted.

-DCL[n], GDCL: Dirty Cache Lock: The -DCL[n] signals are issued by all the caching devices on the bus. The purpose of this signal is to let the caching devices indicate that the current read or write operation hit in a dirty cache block. During reads, GDCL indicates to the master that data supplied by the slave is stale. During all types of operations, the -DCL lines are used to preemptively gain control of the bus so that the intervenor can supply updated memory to the requestor and to memory by doing a block write.

GATEA20: This signal, which exists only on the Primary Processor slot, slot 0Fh, is driven by the ABI and received by the primary processor. When this signal is active, the processor drives bit 20 of the address line to any desired value. When this bit is inactive bit 20 of the address is set to zero. The purpose of this signal is to replicate the method in which IBM PC's work around an 80286 bug in implementing address wrap around for addresses above the address limit.

-GNT[n]: The Bus Grant signals are driven by the arbiter to the arbitrating devices on the NexBus to indicate that the bus has been granted to the requesting device. These signals are driven active at the rising edge of the BCLK.

-HOLD32[n]: The Hold Bus for 32-Bit Transfer signals are asserted by a 32-bit wide device receiving data (either a master performing a read operation or a slave in a write operation) to tell the arbiter not to immediately re-grant the bus after the fall of GXACK and to cause the swapping logic to latch and transfer the high-order four bytes of data from AD<63:32> onto AD<31:0>.

-INTR[n]: The Interrupt signals are generated by the interrupt controllers on the ABI and dispatched radially to each processor slot (primary or secondary) on the NexBus.

-IRQ<3:7,9:12,14:15>: The Interrupt Request signals are logically combined with the interrupt request lines on the AB, and are used by individual devices on the NexBus to gain the attention of a processor. Certain interrupt levels are pre-defined: -IRQ<0> is a periodic interrupt from the system timers; -IRQ<1> is the interrupt from the Keyboard Controller; -IRQ<2> is an internal cascade signal from one interrupt controller to another and is not available for use; -IRQ<8> is used as a general purpose interrupt from the Real Time Clock. -IRQ<13> is derived from -NPIRQ[n] lines (as described below). Therefore, only levels 3-7, 9-12, and 14-15 are available as lines on the NexBus.

-LATCH32[n]: The Latch 32 Bits of Data signals are driven by a 32-bit wide data provider (a master doing a write operation or a slave in a read operation) to cause the swapping logic to latch the contents of AD<31:0> and transfer it to AD<63:32>.

-NMI: The Non-Maskable Interrupt, which exists only on the Primary Processor slot, SlotID 0Fh, is generated by the ABI in response to any of several error conditions, including -CHCHK on the NexBus or Alternate Bus. It drives the -NMI pin of the primary processor on the NexBus.

-NPIRQ[n]: The Numeric Processor Interrupt Request lines, which exist only on the processor slots, slotIDs 0Ch-0Fh, are driven active by a processor to cause a level-13 interrupt request to the interrupt controller that services that processor slot.

-NREQ[n]: The NexBus Request signals are driven by the masters on the NexBus. The arbiter examines them in conjunction with the -AREQ lines and the state of the ABI to arbitrate bus mastership at the end of each bus sequence. At any time one or more of these signals may be active, requesting the bus, but only one can be granted the NexBus. The bus request signals normally remain active until the corresponding grant line goes active. The requesting devices drive these signals active at the rising edge of the BCLK.

-RESET: The Reset signal is driven by the bus backplane and received by all the devices on the bus. The purpose of this signal is to reset all the adapters on the NexBus. It is redundant, since the same information is contained on the SR signal.

-RESETCPU: The Reset CPU signal, which exists only on the Primary Processor slot, slotID 0Fh, is generated by the ABI and received by the primary processor. The purpose of the this signal is to reset one designated processor.

-SHARE[n], GSHARE: Shared Data: The -SHARE[n] signals are issued by all the caching devices on the bus. The purpose of this signal is to let the caching devices indicate that the current read operation hit in a cache block that is present in another device's cache. During reads, GSHARE indicates to the master that data being read must be cached as SHARED (if cached at all), unless the master has asserted -OWN (transmitted on AD<49> during the address/status phase of a bus operation). The state of GSHARE must be ignored during any operations with -OWN asserted.

SR: The Sync/Reset signal, which originates in the master Clock Distribution (CDIS) chip, is distributed radially on the backplane. It conveys a serial code which includes timing information to synchronize all CDIS chips on all adapters. It also conveys the System RESET signal and bus operating frequency information.

SLOTID<3:0>: Slot ID bits 3 through 0 are encoded on the connector to geographically distinguish one slot from another. This will allow the NexBus to have a maximum of sixteen slots.

TAL: The Try Again Later signal indicates to the master that the current operation cannot be completed at this time because the AB is not available. The TAL signal is transmitted by the ABI, and monitored by all master devices on the NexBus. Upon detecting an active TAL, the master will abort the current operation and will re-try it later. In order to secure the bus for re-trying the operation, the master must assert its -AREQ, thereby assuring that the AB will be available when it is re-granted the bus.

-XACK[n], GXACK: Transfer Acknowledge: The -XACK[n] signals are driven by the slave after it has decoded the address and determined that it is a party in the current operation. The ABI monitors GXACK to determine whether a NexBus device responds to an address within three clocks, to decide whether it needs to perform a crossing operation. During a read operation the master monitors GXACK and GXHLD to determine when data is available on the bus. During a write operation the master again monitors these signals to determine when data is accepted by the slave.

-XHLD[n], GXHLD: Transfer Hold: The -XHLD[n] signals may be driven by the master, the slave, or by a third party monitoring an operation, in order to insert wait states into an operation. Both master and slave must monitor GXHLD to synchronize data transfer.

Appendix 2- Control Signals

Radial and Group Signals

These signals are driven radially from each adapter to motherboard logic. Corresponding group signals (prefix G) are derived from NANDing the adapter signals. Group signals except those marked with an (*) are distributed to the adapters within one clock period.

| -ALE[n] | GALE |
| -AREQ[n] | GCACHBL |
| -CACHBL[n] | GDCL |

-continued

| -DCL[n] | GHOLD 32 (*) |
| -HOLD32[n] | GLATCH32 (*) |
| -LATCH32[n] | |
| -NPIRQ[n] | |
| -AREQ[n] | |
| -NREQ[n] | |
| -XACK[n] | GXACK |
| -XHLD[n] | GXHLD |

Synchronous Radial Receive-Only Signals

These signals are driven by motherboard logic on one clock edge and received on the adapters on the next clock edge.
-GNT[n]
-RESET
-RESETCPU
SR
TAL Asynchronous Signals These signals are asynchronous. All except those marked with an (*) are driven by motherboard logic and received by the adapters.
-CHCHK (*)
GATEA20
-INTR[n]
-IRQ<3:7,9:12,14:15>(*)
-NMI
SLOTID<3:0>

Appendix 3 - Address and Status Information

AD<1:0>: Reserved: Current bus masters must drive these bits high (inactive).

AD<2>: ADRS<2> is used as the least-significant 4-byte Word address for I/O operations. It is not used for memory-reference operations and may be driven to either defined state (either 0 or 1).

AD<31:3>: ADRS<31:3> specify a DWord within the 4-Gbyte memory address space for memory references. ADRS<15:3> specifies a DWord address within the 64-Kbyte I/O address space for I/O operations, and AD<31:16> must be 0.

AD<39:32>: -BE<7:0> Byte-Enable bits 7 through 0 are framing bits associated with the data of the current bus operation. In I/O operations, -BE<7:4> are not used and must be driven high (inactive), while -BE<3:0> specify the byte(s) to be transferred on AD<31:0>. In a memory operation, all eight bits are used to specify the byte(s) to be transferred on AD<63:0>. In a multiDWord block transfer operation the BE's have meaning only for the first DWord of the transfer, and only for write operations; the rest of the DWords have implicit byte enable bits of all 0's, i.e., all bytes are to be transferred in each of the other DWords. Even if a master is requesting a block read operation, it should use the BE's to specify the bytes that it needs immediately, since a non-cacheable slave may force a single-DWord transfer operation and then needs only to return to the master only those bytes for which BE's are asserted.

AD<45:40>: MID<5:0>: Master ID bits 5 are driven by the masters indicating their ID number. It indicates to the slave, and to the ABI during crossing operations, which master is currently doing operations on the bus. The most significant four bits of the MID field are the same as the SLOTID bits. The least significant 2 bits are dependent upon the devices in the designated slot. So, a given slot may accommodate up to four devices.

AD<48:46>: OPTYPE<2:0> are driven by the master to define the type of operation to be performed. Note that AD<48:46> have the same meaning that these signals have in the 80386 microprocessor.

| AD<48> M/-IO | AD<47> D/-C | AD<46> W/-R | BUS OPERATION TYPE |
|---|---|---|---|
| 0 | 0 | 0 | INTERRUPT ACK |
| 0 | 0 | 1 | HALT, SHUTDOWN |
| 0 | 1 | 0 | I/O DATA READ |
| 0 | 1 | 1 | I/O DATA WRITE |
| 1 | 0 | 0 | MEM CODE READ |
| 1 | 0 | 1 | HALT, SHUTDOWN |
| 1 | 1 | 0 | MEM DATA READ |
| 1 | 1 | 1 | MEM DATA WRITE |

AD<49>: -OWN may be driven active during read or write operations. This signal is driven by the master during such operations requesting the ownership of data in its cache. If this operation hits in the cache of another caching master, then that master must change the status of its cache line to the ABSENT, rather than SHARED, state.

AD<51:50>: -BLOCK4, -BLOCK2: For memory references, these two bits define the size of data requested to be transferred in the operation, as shown in Table 2, below. For single-DWord operations and block writes, the bytes to be transferred in the first DWord, hence, the size of the transfer, can be specified by the Byte Enable bits described above. Note that if the slave is incapable of transferring more than a single DWord it may deny a request for a larger block by negating its XACK signal after a single DWord, or the bytes thereof specified by the Byte Enable bits, have been transferred. These bits should be "1" for I/O operations.

| -BLOCK4 AD<51> | -BLOCK2 AD<50> | BLOCK SIZE |
|---|---|---|
| 1 | 1 | Single DWord (0 to 8 bytes) |
| 1 | 0 | 2-DWord Block (8 to 16 bytes) |
| 0 | 1 | 4-DWord Block (24 to 32 bytes) |
| 0 | 0 | not used: Specified as "don't care" |

AD<52>: -ECHO is asserted to cause the ABI to echo the operation onto the Alternate Bus, even if the operation does not require a crossing transfer. It will normally be asserted only for write operations on data shared between a NexBus master and a caching master on the AB. (If all operations were performed with -ECHO asserted the NexBus would be forced to perform at the speed of the AB.) -ECHO may be asserted for a read, but it must not be asserted for a Block operation.

AD<63:53>: Reserved: Current bus masters must drive these bits high (inactive).

| Appendix 4 - Steering Control PAL Equations and State Machine | | | |
|---|---|---|---|
| Inputs: | BLCK | Outputs: | -LTOUCE |
| | GXACK | | -LTOUOE |
| | GXHLD | | -UTOLCE |
| | GLATCH32 | | -UTOLOE |
| | GHOLD32 | | |
| | -RESET | | |
| LOTOUCE and LTOUOE Equations | | | |
|     LTOUCE := -GLATCH32 | | | |
|     LTOUOE := GLATCH32 & (-RESET) | | | |
| State Equations | | | |
|     LATCH_UPPER_DATA = GXACK & (-GXHLD) & GHOLD32 | | | |
|     state HSIDLE :if LATCH_UPPER_DATA | | | |
|         then HS1 | | | |
|         else HSIDLE | | | |
|     state HS1 :go to HS2 | | | |
|     state HS2 :go to HS3 | | | |
|     state HS3 :if GHOLD32 | | | |
|         then HS3 | | | |
|         else HSIDLE | | | |
| UTOLCE and HUOLOE Equations | | | |
|     HS := HSIDLE & RESET | | | |
|     UTOLCE := (HS == HSIDLE) & LATCH_UPPER_DATA | | | |
|     UTOLOE := (HS == HS2) # ((HS == HS3) & GHOLD32) | | | |
| Symbol Meanings | | | |
|     A = B | signifies that the logical value of A equals the logical value of B, and the value of A changes as soon as value of B changes. | | |
|     := | signifies that the logical value of A equals the logical value of B that existed at the previous leading clock edge. | | |
|     == | signifies that the state machine on the left side is in the state on the right side. | | |
|     & | signifies logical AND. | | |
|     # | signifies logical OR. | | |

What is claimed is:

1. A data communication system 2 comprising:
a bus including a 2N-bit wide data bus having an N-bit lower half and an N-bit upper half;
a bus clock having a frequency that defines a repetitive series of time intervals, referred to as bus cycles;
a source unit having means, coupled to both halves of said bus, for providing 2N bits of data on said upper and lower halves in a single bus cycle;
a sink unit having means, coupled to said lower half, for receiving N bits of data from said lower half in a single bus cycle;

means for initiating a communication between said source and sink units;

means for causing said source unit to provide N bits of data on said upper half and N bits of data on said lower half during a first given bus cycle;

means, associated with said sink unit and separate from said source unit, for asserting a particular type of signal, referred to as HOLDN signal, as part of said communication;

steering control means, responsive to said HOLDN signal and separate from said source and sink units, for generating first and second swap-down control signals;

an N-bit swap-down register, coupled to said upper half and responsive to said first swap-down control signal, for storing said N bits of data provided by said source unit on said upper half during said first given bus cycle;

an N-bit swap-down driver, coupled between said swapdown register and said lower half and responsive to said second swap-down control signal, for driving said N bits of data stored in said swap-down register onto said lower half during a second given bus cycle later than said first given bus cycle; and means for causing said sink unit to read said N bits of data provided by said source unit on said lower half during said first given bus cycle and to read said N bits of data driven onto said lower half by said swap-down driver during said second given bus cycle;

whereby said sink unit identifies itself to said steering control means as a device capable of receiving N bits of data in a single bus cycle by asserting said HOLDN signal.

2. The data communication system of claim 1 wherein said first and second given bus cycles are separated by one bus cycle.

3. The data communication system of claim 1 wherein said swap-down driver ceases driving the data stored in said swap-down register one bus cycle after said HOLDN signal is withdrawn.

4. The data communication system of claim 1 wherein:

said means for initiating includes means for establishing an address phase on said bus; and said first given bus cycle is later than said address phase.

5. A data communication system comprising:

a bus including a 2N-bit wide data bus having an N-bit lower half and an N-bit upper half;

a bus clock having a frequency that defines a repetitive series of time intervals, referred to as bus cycles;

a source unit having means, coupled to said lower half, for providing N bits of data on said lower half in a single bus cycle;

a sink unit having means, coupled to both halves of said bus, for receiving 2N bits of data from said upper and lower halves in a single bus cycle;

means for initiating a communication between said source and sink units;

means for causing said source unit to provide N bits of data on said lower half during a first given bus cycle and to provide N bits of data on said lower half during a second given bus cycle later than said first given bus cycle;

means, associated with said source unit and separate from said sink unit, for asserting a particular type of signal, referred to as LATCHN signal;

steering control means, responsive to said LATCHN signal and separate from said source and sink units, for generating first and second swap-up control signals;

an N-bit swap-up register, coupled to said lower half and responsive to said first swap-up control signal, for storing said N bits of data provided by said source unit on said lower half during said first given bus cycle;

an N-bit swap-up driver, coupled between said swap-up register and said upper half and responsive to said second swap-up control signal, for driving said N bits of data stored in said swap-up register onto said upper half during said second given bus cycle; and means for causing said sink unit to read said N bits of data provided by said source unit on said lower half during said second given bus cycle and to read said N bits of data driven onto said upper half by said swap-up driver during said second given bus cycle;

whereby said source unit identifies itself to said steering control means as a device capable of providing N bitS. Of data in a single bus cycle by asserting said LATCHN signal.

6. The data communication system of claim 5 wherein said first and second given bus cycles are consecutive bus cycles.

7. The data communication system of claim 5 wherein said LATCHN signal is asserted during said first given bus cycle.

8. The data communication system of claim 5 wherein:

said means for initiating includes means for establishing an address phase on said bus; and said first given bus cycle is later than said address phase.

9. A data communication system comprising:

a bus including a 2N-bit wide data bus having an N-bit lower half and an N-bit upper half;

a bus clock having a frequency that defines a repetitive series of time intervals, referred to as bus cycles;

a source unit having means, coupled to said lower half, for providing N bits of data on said lower half in a single bus cycle;

a sink unit having means, coupled to said lower half, for receiving N bits of data from said lower half in a single bus cycle;

means for initiating a communication between said source and sink units;

means for causing said source unit to provide N bits of data on said lower half during a first given bus cycle and to provide N bits of data on said lower half during a second given bus cycle later than said first given bus cycle;

means, associated with said source unit and separate .from said sink unit, for asserting a particular type of signal, referred to as LATCHN signal;

steering control means, responsive to said LATCHN signal and separate from said source and sink units, for generating first and second swap-up control signals;

an N-bit swap-up register, coupled to said lower half and responsive to said first swap-up control signal, for storing said N bits of data provided by said source unit on said lower half during said first given bus cycle;

an N-bit swap-up driver, coupled between said swap-up register and said upper half and responsive to said second swap-up control signal, for driving said N bits of data stored in said swap-up register onto said upper half during said second given bus cycle;

means, responsive to said sink unit, for asserting a particular type of signal, referred to as said HOLDN signal;

said steering control means also having means, responsive to said HOLDN signal ..and separate from said source and sink units, for generating first and second swap-down control signals;

an N bit swap-down register, coupled to said upper half and responsive to said first swap-down control signal, for storing said N bits of data provided by said source unit on said upper half during said first given cycle;

an N-bit swap-down driver, coupled between said swap-down register and said lower half and responsive to said second swap-down control signal, for driving said N bits of data stored in said swap-down register onto said lower half during a third given bus cycle later than said second given bus cycle; and means for causing said sink unit to read said N bits of data provided by said source unit on said lower half during said second given bus cycle and to read said N bits of data driven onto said lower half by said swap-down driver during said third given bus cycle;

whereby said source unit identifies itself to said steering control means as a device capable of providing N bits of data in a single bus cycle by asserting said LATCHN signal and said sink unit identifies itself to said steering control means as a device capable of receiving N bits of data in a single bus cycle by asserting said HOLDN signal.

10. The data communication system of claim 9 wherein said first and second given bus cycles are consecutive bus cycles.

11. The data communication system of claim 9 wherein said LATCHN signal is asserted during said first given bus cycle.

12. The data communication system of claim 9 wherein said second and third given bus cycles are separated by one bus cycle.

13. The data communication system of claim 9 wherein said swap-down driver ceases driving the data stored in said swap-down register one bus cycle after said HOLDN signal is withdrawn.

14. The data communication system of claim 9 wherein:

said means for initiating includes means for establishing an address phase on said bus; and said first given bus cycle is later than said address phase.

15. The data communication system of claim 5 wherein:

said means for initiating includes means for establishing an address phase on said bus; and said second bus cycle is earlier than any subsequent address phase.

16. In a data communication system having a bus including a 2N-bit wide data bus having an N-bit lower half and an N-bit upper half, and a bus clock having a frequency that defines a repetitive series of time intervals, referred to as bus cycles, circuitry for permitting a sink unit having data receiving means, coupled only to said lower half, to receive in first and second given bus cycles 2N bits of data provided on said upper and lower halves in said first given bus cycle, said second given bus cycle being later than said first given bus cycle, comprising:

steering control means, responsive to said sink unit and separate from said sink unit, for generating first and second swap-down control signals in response to a particular signal from said sink unit;

an N-bit swap-down register, coupled to said upper half and responsive to the assertion of said first swap-down control signal, for storing said N bits of data provided on said upper half during said first given bus cycle;

an N-bit swap-down driver, coupled between said swapdown register and said lower half and responsive to said second swap-down control signal, for driving said N bits of data stored in said swap-down register onto said lower half during said second given bus cycle; and means for causing said sink unit to read said N bits of data provided on said lower half during said first given bus cycle and to read said N bits of data driven onto said lower half by said swap-down driver during said second given bus cycle;

whereby said sink unit identifies itself to said steering control means as a device capable of receiving N bits of data in a single bus cycle by asserting said particular signal.

17. In a data communication system having a bus including a 2N-bit wide data bus having an N-bit lower half and an N-bit upper half, and a bus clock having a frequency that defines a repetitive series of time intervals, referred to as bus cycles, circuitry for permitting a source unit having data driving means, coupled only to said lower half, to operate as if providing 2N bits of data on said upper and lower halves in a single bus cycle, comprising:

means for causing said source unit to provide N bits of data on said lower half during a first given bus cycle and to provide N bits of data on said lower half during a second given bus cycle later than said first given bus cycle;

steering control means, responsive to said source unit and separate from said source unit, for generating first and second swap-up control signals in response to a particular signal from said source unit;

an N-bit swap-up register, coupled to said lower half and responsive to said first swap-up control signal, for storing said N bits of data provided by said source unit on said lower half during said first given bus cycle; and an N-bit swap-up driver, coupled between said swap-up register and said upper half and responsive to the assertion of said second swap-up control signal, for driving said N bits of data stored in said swap-up register onto said upper half during said second given bus cycle;

whereby said source unit identifies itself to said steering control unit as a device capable of providing N bits of data in a single bus cycle by asserting said particular signal.

18. A data communication system comprising:

a bus including a 2N-bit wide data bus having an N-bit lower half and an N-bit upper half;

a bus clock having a frequency that defines a repetitive series of time intervals, referred to as bus cycles;

a first unit, referred to as the 2N-bit unit, having first bidirectional means, coupled to both halves of said bus, for selectively providing or receiving 2N bits of data on said upper and lower halves in a single bus cycle;

a second unit, referred to as the N-bit unit, having second bidirectional means, coupled to said lower half, for selectively providing or receiving N bits of data from said lower half in a single bus cycle;

means for effecting a transfer of 2N bits of data from said N-bit unit to said 2N-bit unit, including means for causing said N-bit unit to provide N bits of data on said lower half during a first given bus cycle and to provide N bits of data on said lower half during a second given bus cycle later than said first given bus cycle, first steering control means, responsive to said N-bit unit and separate from said N-bit and 2N-bit units., for generating first and second swap-up control signals .in response to a first particular signal from said N-bit unit.

an N-bit swap-up register, coupled to said lower half and responsive to said first swap-up control signal, for storing said N bits of data provided by said N-bit unit on said lower half during said first given bus cycle, an N-bit swap-up driver, coupled between said swap-up register and said upper half and responsive to said second swap-up control signal, for driving said N bits of data stored in said swap-up register onto said upper half during said second given bus cycle, and means for causing said 2N-bit unit to read said N bits of data provided by said N-bit unit on said lower half during said second given bus cycle and to read said N bits of data driven onto said upper half by said swap-up driver during said second given bus cycle, whereby said N-bit unit identifies itself to said first steering control means as a device capable of providing N bits of data in a single bus cycle by asserting said first particular signal; and means for effecting a transfer of 2N bits of data from said 2N-bit unit to said N-bit unit including means for causing said 2N-bit unit to provide N bits of data on said upper half and N bits of data on said lower half during a first given bus cycle, second steering control means, responsive to said N-bit unit and separate from said N-bit and 2N-bit units, for generating first and second swap-down control signals in response to a second particular signal from said N-bit unit, an N bit swap-down register, coupled to said upper half and responsive to said first swap-down control signal, for storing said N bits of data provided by said 2N-bit unit on said upper half during said first given cycle, an N-bit swap-down driver, coupled between said swapdown register and said lower half and responsive to second swap-down control signal, for driving said N bits of data stored in said swap-down register onto said lower half during a third given bus cycle later than said second given bus cycle, and means for causing said N-bit unit to read said N bits of data provided by said 2N-bit unit on said lower half during said second given bus cycle and to read said N bits of data driven onto said lower half by said swap-down driver during said third given bus cycle;

whereby said N-bit unit identifies itself to said second steering control means as a device capable of receiving N bits of data in a single bus cycle by asserting said second particular signal.

19. The data communication system of claim 1 wherein said source unit is a master.

20. The data communications system of claim 1 wherein said sink unit is a master.

21. The data communications system of claim 1 wherein said source unit is a slave.

22. The data communications system of claim 1 wherein said sink unit is a slave.

23. The data communications system of claim 5 wherein said source unit is a master.

24. The data communications system of claim 5 wherein said sink unit is a master.

25. The data communications system of claim 5 wherein said source unit is a slave.

26. The data communications system of claim 5 wherein said sink unit is a slave.

27. A method of transferring 2N bits of data from a source unit to a sink unit on a 2N-bit wide data bus having an Nbit lower half and an N-bit upper half, said source unit being coupled to both halves of said bus and capable of providing 2N bits of data, said sink unit being coupled to said lower half and capable of receiving N bits of data, said method comprising the steps of:

generating a repetitive series of time intervals, referred to as bus cycles;

initiating a communication between said source unit and said sink unit;

said source unit providing N bits of data on said upper half and N bits of data on said lower half during said first given bus cycle;

asserting a particular type of signal, said signal being associated with said sink unit and separate from said source unit, said signal referred to as HOLDN signal as part of said communication, said sink unit identifying itself as a device capable of receiving N bits of data by asserting said HOLDN signal;

generating first and second swap-down control signals, responsive to said HOLDN signal and separate from said source and sink units;

storing said N bits of data provided by said source unit on said upper half during said first given bus cycle in response to said first swap-down control signal;

drivingsaid N bits of data, so stored, onto said lower half during a second given bus cycle later than said first given bus cycle, in response to said second swap-down control signal; and causing said sink unit to read said N bits of data provided by said source unit on said lower half during said first given bus cycle and to read said N bits of data driven onto said lower half during second given bus cycle.

28. A method of transferring 2N bits of data from a source unit to a sink unit on a 2N-bit wide data bus having an Nbit lower half and an N-bit upper half, said source unit being coupled to said lower half and capable of providing N bits of data, said sink unit being coupled to both halves of said bus and capable of receiving 2N bits of data, said method comprising the steps of:

generating a repetitive series of time intervals, referred to as bus cycles;

initiating a communication between said source unit and said sink unit;

said source unit providing N bits of data on said lower half during a first given bus cycle and providing N bits of data on said lower half during a second given bus cycle later than said first given bus cycle;

asserting a particular type of signal, said signal associated with said source unit and separate from said sink unit, said signal referred to as LATCHN signal as part of said communication, said source unit identifying itself as a device capable of providing N bits of data by asserting said LATCHN signal;

generating first and second swap-up control signals, responsive to said LATCHN signal and separate from said source unit and said sink unit;

storing said N bits of data provided by said source unit on said lower half during said first given bus cycle in response to said first swap-up control signal;

driving said N bits of data, so stored, onto said upper half during said second given bus cycle in response to said second swap-up control signal; and causing said sink unit to read said N bits of data provided by said source unit on said lower half during said second given bus cycle and to read said N bits of data driven onto said upper half during said second given bus cycle.

* * * * *